Feb. 24, 1970  E. W. REINHARDT ET AL  3,496,713
PEANUT SHAKER AND INVERTER

Filed Nov. 5, 1968  4 Sheets-Sheet 1

INVENTORS
ELI W. REINHARDT,
MILDRED E. REINHARDT,
HENRY E. MORRIS,
BY Kimmel, Crowell & Weaver
ATTORNEYS

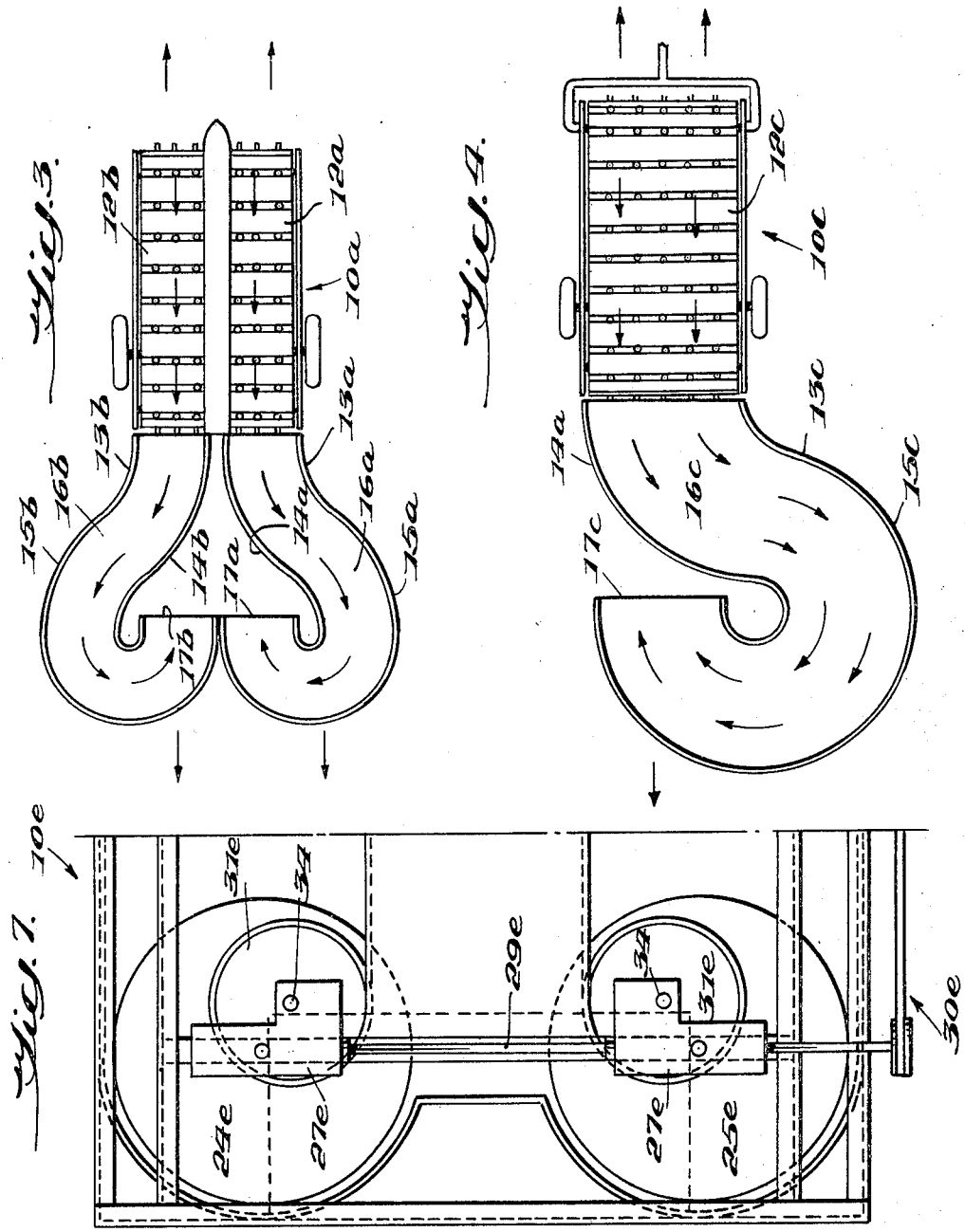

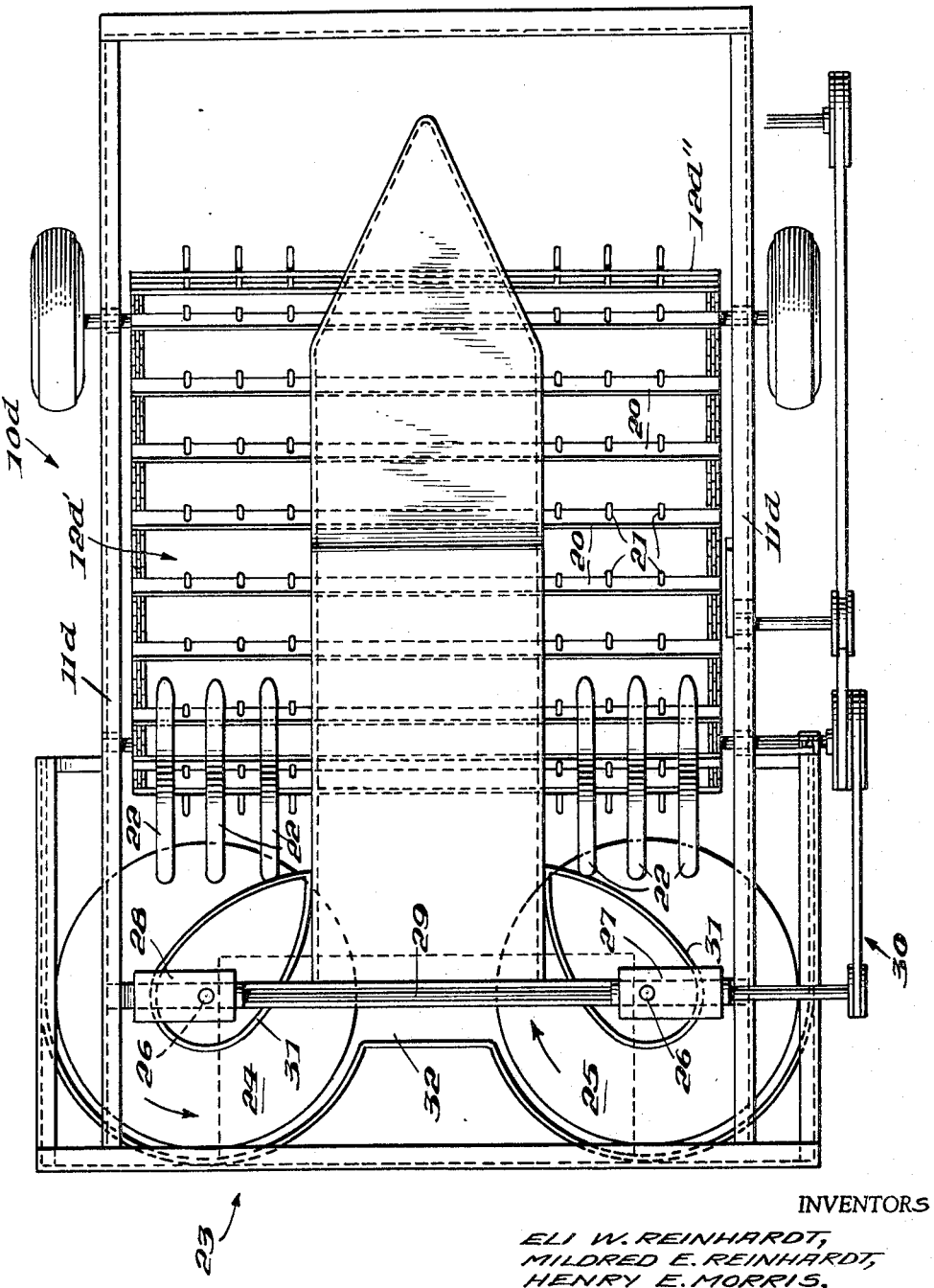

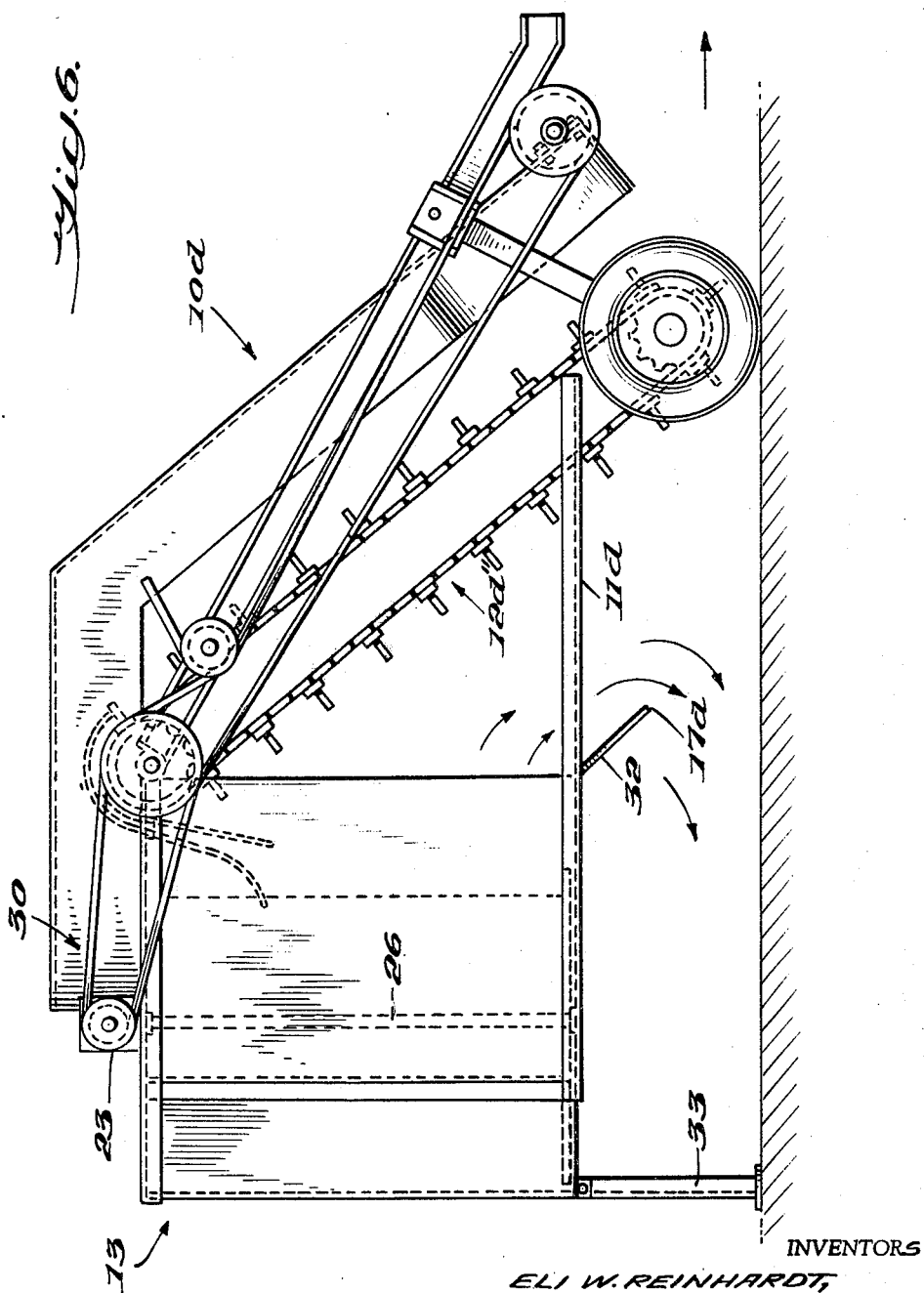

United States Patent Office 3,496,713
Patented Feb. 24, 1970

3,496,713
PEANUT SHAKER AND INVERTER
Eli W. Reinhardt, Mildred E. Reinhardt, and Henry E. Morris, all of P.O. Box 72, Ashburn, Ga. 31714
Continuation-in-part of application Ser. No. 528,030, Feb. 14, 1966. This application Nov. 5, 1968, Ser. No. 773,375
Int. Cl. A01d 79/00
U.S. Cl. 56—370
8 Claims

ABSTRACT OF THE DISCLOSURE

A device for lifting a mat of cut peanut vines from the ground, raising them into the air so that loose dirt will be shaken therefrom, and then inverting the vines so that they lie with the leaves of the vines down and the roots up exposed to the air.

CROSS-REFERENCE TO RELATED APPLICATION

This application is a continuation-in-part of application Ser. No. 528,030 filed Feb. 14, 1966, and copending herewith, now abandoned.

BACKGROUND OF THE INVENTION

Field of the invention

Historically, peanut growers harvested the peanut vines and stacked them around a pole for curing after which they were fed to a combine so that the peanuts could be separated from the vines. A more modern approach to the harvesting of peanuts has been to plow underneath the peanuts and lift the tangle of peanut vines resembling a carpet onto an openwork inclining conveyor for sifting out rocks and soil. The vines were then dropped onto the ground where they would remain for some few days for curing by nature before being picked up and thrashed by a moving combine. This method proved to be simple and economical but required dry weather between the plowing and the threshing. Should wet weather set in, some and possibly all of the crop could be lost. The peanut vines are tremendously intwined and interlock when they are plowed up and remain in this intertwined condition as they are moved over the inclined conveyor returning to the ground in this same matted form with the leaves and roots having this same relationship as when they were grown. The structure of the interwoven peanut vines is such that even if a small section should flip over with the roots exposed, it will be flipped back over by the pressure from the portions of the vines ahead of and behind that portion which flipped over. With the peanuts on the dirt and exposed wet weather spoilage takes place quite rapidly both in the peanuts and in the delicate stems which hold the peanuts so that even the good peanuts remaining will fall from the vines as they are lifted for combining and be lost.

Machines for harvesting peanuts conventionally use cutting blades which engage under at least one row of peanut plants, and as the machine moves over the ground, cut each row loose in a continuous carpet like mat. An openwork conveyor then conventionally lifts the peanuts into the air, and due to the vibration of the machine, dirt is shaken loose from the plants while they are in the air. Each carpet like mat is then laid down on the ground in a conventional machine with the roots down and the leaves up. Such conventional machines are called peanut diggers and shakers, one of which is disclosed in the U.S. patent to W. R. Long, Patent No. 2,999,547 issued Sept. 12, 1961. The instant invention is an attachment for the peanut digger and shaker of the Long type and utilizes the same general structural connections to a tractor as is illustrated in FIGURE 2 of Long.

SUMMARY OF THE INVENTION

The present invention relates generally to an attachment for a peanut digger and shaker which receives at least one carpet like mat of peanut vines from the shaken conveyor and returns the mat of vines to the ground in an inverted condition so that the leaves of the peanut vines are in contact with the ground and the roots are on top exposed to the air.

DESCRIPTION OF THE DRAWINGS

FIGURE 3 is a top plan view of the modified form of the invention;
FIGURE 4 is a top plan view of another modified form of the invention;
FIGURE 5 is a top plan view of another modified form of the invention;
FIGURE 6 is a side elevation of the structure illustrated in FIGURE 5;
and
FIGURE 7 is a top plan view of still another modified form of the invention.

DESCRIPTION OF THE PREFERRED EMBODIMENTS

Figure 1:
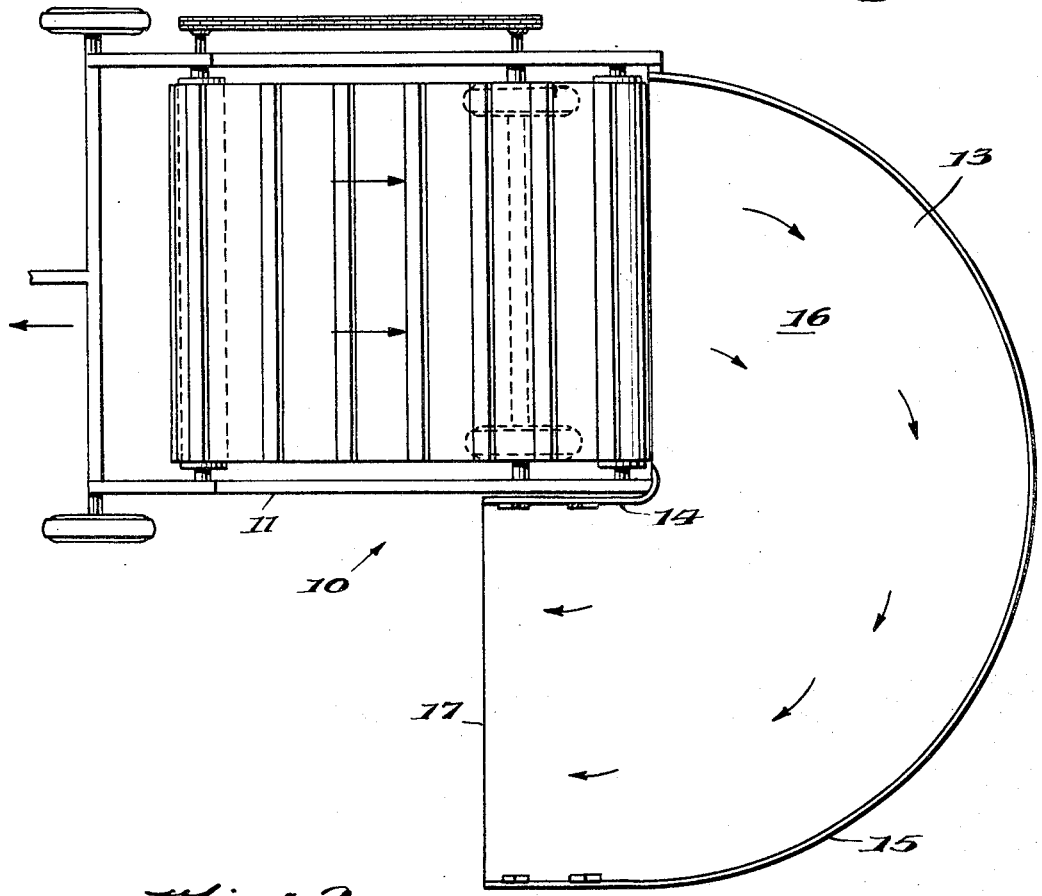
FIGURE 1 is a top plan view of one form of the invention.

Referring now to the drawings in detail wherein like reference characters indicate like parts throughout the several figures, the reference numeral 10 indicates generally a peanut shaker and inverter constructed in accordance with the invention.

The peanut shaker and inverter 10 includes a frame 11 on which is supported a conventional peanut shaker conveyor 12 inclining upwardly and rearwardly on the frame 11.

Figure 2:
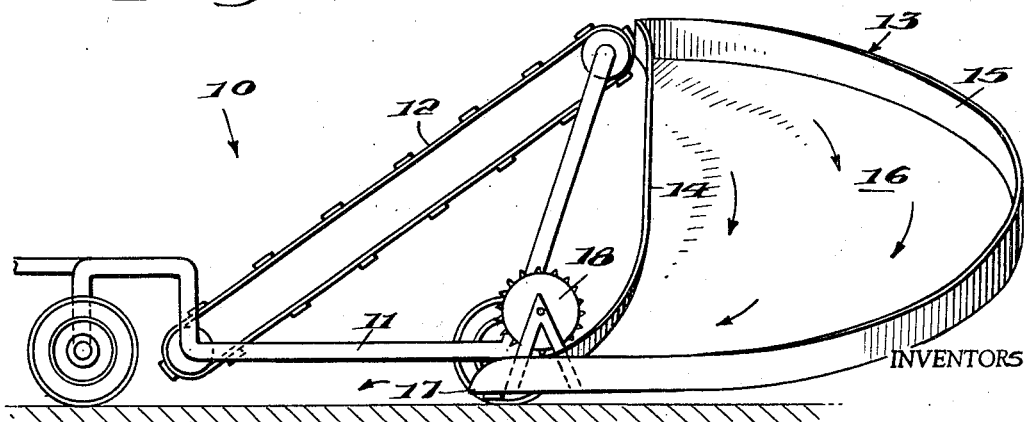
FIGURE 2 is a side elevation of the invention illustrated in FIGURE 1.

A generally helical chute 13 is supported on the frame 11 rearwardly of the conveyor 12 in a position to receive the peanut vines as they are discharged from the conveyor 12. The chute 13 has opposite side walls 14, 15 to retain the peanut vines within the confines of the chute 13. The central portion 16 of the chute 13 begins at a point just underlying the upper end of the conveyor 12 and slopes downwardly and outwardly and then forwardly terminating in a line 17 extending transversely to the path of travel of the peanut digger and shaker 10, as can be seen in FIGURES 1 and 2.

The transverse edge 17 of the chute 13 is spaced above the ground over which the peanut shaker and inverter is traveling so that as the peanut vines are discharged from the forward end of the chute 13 they are inverted and pass beneath the forward end 17 of the chute 16 to occupy an area or strip immediately adjacent to the area or strip from which they were dug. A power driven cogged roller 18 is mounted adjacent the forward end 17 of the chute 13 and is adapted to assist in moving the peanut vines from the chute 13 should this be found necessary. The cog roller 18 is optional and may be used with any form of the invention where it is found necessary.

A modified form of the invention is illustrated in FIG. 3 wherein a pair of conveyor shakers 12a, 12b are arranged in adjacent parallel relation and discharge onto a pair of helical chutes 13a, 13b. The chutes 13a, 13b are sloped downwardly and circularly to provide a lower forward edge 17a, 17b arranged transversely of the direction of travel of the peanut shaker and inverter 10a, but with the discharge point being directly in line with the respective conveyor 12a, 12b so that the peanut vines are discharged onto the same strip of ground from which they were taken only in an inverted relation. The chutes 13a, 13b are provided with respective side walls 14a, 15a, and 14b, 15b to guide the peanut vines to the point of discharge 17a, 17b.

In FIGURE 4, another modified form of the invention is illustrated wherein the peanut shaker and inverter 10c is associated with a shaker conveyor 12c and has a chute 13c arranged in a downwardly sloping helical arrangement so that the central portion 16c thereof terminates in a lower forward end 17c arranged transversely to the direction of travel of the conveyor 12c. The chute 13c is provided with guiding side walls 14c, 15c to keep the peanut vines on the central portion 16c of the chute 13c.

In FIGURES 5 and 6, a still further modification of the invention is illustrated. The peanut shaker and inverter 10d includes a frame 11d on which is mounted a pair of shaker conveyors 12d' and 12d'' extending upwardly and rearwardly and are arranged to deliver the peanut vines rearwardly where they are discharged at the upper end of the conveyors 12d' and 12d''. The conveyors 12d' and 12d'' each includes a plurality of crossmembers 20 with each of the crossmembers 20 having a plurality of spaced apart upstanding pins 21 arranged thereon to engage and move the peanut vines as the peanut shaker and inverter moves forwardly through the field. A plurality of stripper members 22 are arranged intermediate the pins 21 so that as the pins 21 move past the upper ends of the conveyors 12d' and 12d'' the peanut vines engaged therewith are stripped from the pins 21 to permit the pins 21 to return to the underside of the conveyors 12d' and 12d'' and the peanut vines to move onto the inverter generally indicated at 23. These strippers are optional and useful when vines are wet and heavy. The inverter 23 is mounted on the frame 11d and is arranged to underlie the upper end of the conveyors 12d' and 12d'' to receive the peanut vines delivered thereby. The inverter 23 includes a pair of discs 24, 25 arranged in transversely spaced apart positions rearwardly of the conveyors 12d' and 12d''. Each of the discs 24, 25 are mounted to shafts 26 supported in the frame 11d and driven through a gearbox 27, 28 by a drive shaft 29 driven from a belt drive train generally indicated at 30. Each of the discs 24, 25 has a tear shaped central guide 31 arranged to hold the peanut vines out of the center of the respective discs 24, 25. An apron 32 receives the peanut vines from the discs 24, 25 with the apron 32 terminating in an edge 17d extending transversely of the direction of travel of the peanut shaker and inverted 10d so that peanut vines discharged therefrom pass under the inverter 23 and are placed on the ground in substantially the same path from which they were removed.

Folding legs 33 are arranged on the opposite rear corners of the peanut shaker and inverter 10d to support the device when removed from the driving tractor.

FIGURE 7 illustrates another modified form of the invention similar to that illustrated in FIGURES 5 and 6 and in which the central guides 31e are circular and are mounted on shafts 34 rotated through a gearbox 27e driven by a drive shaft 29e powered by a belt drive system 30e. The discs 24e, 25e are mounted and driven the same as the discs 24, 25, and the structure otherwise of the peanut inverter 10e is identical to the peanut inverter 10d.

Basically, the invention in each modification thereof consists of a peanut shaker conveyor to which has been attached a device for receiving the peanut vines and inverting the vines onto the ground surface with the roots of the peanut vines exposed to the air.

Having thus described the preferred embodiments of the invention, it should be understood that numerous other modifications may be resorted to without departing from the spirit of the invention.

What is claimed is:

1. In a combined peanut shaker and inverter of the type including a tractor drawn frame, a tractor driven endless chain peanut vine conveyor extending upwardly and rearwardly on said frame, said chain conveyor discharging said peanut vines at a substantial distance above the ground, an inverter comprising a pair of slide conveyors positioned on said frame and each having one end underlying the discharge end of said chain conveyor and adapted to receive peanut vines discharged therefrom, said slide conveyors sloping downwardly and curving oppositely outwardly and then inwardly and terminating in side-by-side relation directly toward the path of travel of said inverter to discharge the peanut vines on the ground in an inverted condition with the leaves down and the roots exposed to the air, said slide conveyors each including a circular disc lying generally with flat sides parallel to the ground rotating toward said endless conveyor and toward each other with guard rails to guide peanut vines on and outwardly around on said circular disc and around inwardly of said circular disc and guided in a manner to be shed while moving toward and in line with the center of said endless conveyor.

2. A device as claimed in claim 1 wherein said circular disc includes an inside guide mounted to overlie said disc to prevent peanut vines from becoming clogged on the center of said disc.

3. A device as claimed in claim 2 wherein said inside guide is mounted for rotation about its vertical axis.

4. In a combined peanut shaker and inverter of the type including a frame, upwardly and rearwardly extending conveying means on the frame conveying peanut vines from the ground with said conveying means discharging said peanut vines at a substantial distance above the ground, an inverter comprising slide conveyor means on said frame having one end underlying the discharge end of said conveyor means and adapted to receive peanut vines discharged therefrom, said slide conveyor means sloping downwardly and curving forwardly toward the path of travel of said inverter with the discharging end lying generally in line with and behind said endless conveyor to discharge the peanut vines on the ground in an inverted condition with the leaves down and the roots exposed to the air in line generally with the location from whence they were lifted, said slide conveyor means having its lower forward end terminating in a substantially straight discharge edge extending transverse to the direction of travel of the frame and extending substantially parallel to the ground.

5. The structure in claim 4 wherein said slide conveying means includes a pair of slide conveyors positioned in side-by-side relation underlying the discharge end of said endless conveyor, said slide conveyors sloping downwardly and curving oppositely outwardly and then inwardly and forwardly terminating in side-by-side relation directly toward the path of travel of said inverter.

6. In a combined peanut shaker and inverter of the type including a frame, upwardly and rearwardly extending conveying means on the frame conveying peanut vines lifted from the ground with said conveying means discharging said peanut vines at a substantial distance above the ground, an inverter comprising slide conveyor means on said frame having one end underlying the discharge end of said first conveying means and adapted to receive peanut vines discharged therefrom, said slide conveyor means guiding said peanut vines downwardly and forwardly toward the path of travel of said inverter to discharge the peanut vines on the ground in an inverted condition with the leaves down and the roots exposed to the air, said slide conveyor means including at least one flat circular rotating disc lying substantially parallel to the ground, so as to receive peanut vines from the discharge end of said first conveying means and discharge them toward the discharge end of said slide conveyor means, and guides positioned to maintain the peanut vines on said disc while moving therewith.

7. A device as claimed in claim 6 wherein said circular disc includes an inside guide mounted to overlie said disc to prevent peanut vines from becoming clogged on the center of said disc.

8. A device as claimed in claim 7 wherein said inside guide is mounted for rotation about its vertical axis.

References Cited

UNITED STATES PATENTS

| | | | |
|---|---|---|---|
| 2,391,427 | 12/1945 | Kucera | 56—370 |
| 2,609,651 | 9/1952 | Cymara | 56—370 |
| 2,667,731 | 2/1954 | Nerness | 56—372 |
| 2,679,720 | 6/1954 | Cymara | 56—370 |
| 2,999,547 | 9/1961 | Long | 171—101 |

ANTONIO F. GUIDA, Primary Examiner

U.S. Cl. X.R.

56—345; 171—101